US006673263B2

(12) United States Patent
Albu et al.

(10) Patent No.: US 6,673,263 B2
(45) Date of Patent: Jan. 6, 2004

(54) COMPOSITIONS INCORPORATING CHITOSAN FOR PAINT DETACKIFICATION

(75) Inventors: Michael L. Albu, Garden City, MI (US); Phillip J. Beauchamp, Roseville, MI (US)

(73) Assignee: PPG Industries Ohio, Inc., Cleveland, OH (US)

( * ) Notice: Subject to any disclaimer, the term of this patent is extended or adjusted under 35 U.S.C. 154(b) by 167 days.

(21) Appl. No.: 09/916,104

(22) Filed: Jul. 26, 2001

(65) Prior Publication Data

US 2003/0026906 A1 Feb. 6, 2003

(51) Int. Cl.$^7$ .......................... B01D 21/01; C02F 1/52; C02F 5/02
(52) U.S. Cl. ........................ 252/181; 210/730; 210/930; 427/421
(58) Field of Search .......................... 252/181; 210/730, 210/930

(56) References Cited

U.S. PATENT DOCUMENTS

| | | | |
|---|---|---|---|
| 3,338,828 A | * 8/1967 | Clark | 252/181 X |
| 4,504,395 A | 3/1985 | Harpel et al. | 210/712 |
| 4,564,464 A | 1/1986 | Harpel et al. | 252/181 |
| 4,609,470 A | * 9/1986 | Chung et al. | 210/730 X |
| 4,629,572 A | 12/1986 | Leitz et al. | 210/714 |
| 4,637,824 A | 1/1987 | Pominville | 55/85 |
| 4,686,047 A | 8/1987 | Arots | 210/712 |
| 4,759,855 A | 7/1988 | Kaiser | 210/712 |
| 4,879,340 A | 11/1989 | Moriguchi et al. | 525/54.2 |
| 4,880,471 A | 11/1989 | Kaiser | 106/286.6 |
| 4,888,386 A | 12/1989 | Huang et al. | 525/57 |
| 4,913,825 A | 4/1990 | Mitchell | 210/705 |
| 4,980,030 A | 12/1990 | Johnson et al. | 203/4 |
| 5,019,138 A | 5/1991 | Farrah et al. | 55/89 |
| 5,073,205 A | 12/1991 | Morse | 134/38 |
| 5,076,939 A | 12/1991 | Hunter et al. | 210/712 |
| 5,092,928 A | 3/1992 | Spangler | 106/287.34 |
| 5,116,514 A | 5/1992 | Bhattacharyya et al. | 210/712 |
| 5,192,449 A | 3/1993 | Huang et al. | 210/712 |
| 5,215,668 A | 6/1993 | Bhattacharyya et al. | 210/712 |
| 5,223,141 A | 6/1993 | Brown et al. | 210/634 |
| 5,240,509 A | 8/1993 | Rey et al. | 134/38 |
| 5,259,976 A | 11/1993 | Bui et al. | 210/712 |
| 5,269,939 A | * 12/1993 | Laurent et al. | 210/730 X |
| 5,348,799 A | 9/1994 | Boston | 428/323 |
| 5,393,435 A | * 2/1995 | Deans et al. | 210/730 X |
| 5,397,496 A | 3/1995 | Zuerner et al. | |
| 5,443,748 A | 8/1995 | Bergishagen et al. | |
| 5,543,056 A | * 8/1996 | Murcott et al. | 210/730 X |
| 5,599,916 A | 2/1997 | Dutkiewicz et al. | 536/20 |
| 5,702,516 A | 12/1997 | Spangler | 106/287.35 |
| 5,766,370 A | 6/1998 | Patzelt et al. | 134/12 |
| 5,843,509 A | 12/1998 | Calvo Salve et al. | 424/489 |
| 6,020,422 A | 2/2000 | Connors et al. | 524/716 |

FOREIGN PATENT DOCUMENTS

| | | |
|---|---|---|
| CN | 1266821 A | 9/2000 |
| JP | 6-114210 | 4/1994 |
| JP | 09206000 | 10/1997 |

OTHER PUBLICATIONS

George R. Whalley, entitled "Chitosan a Versatile, Natural Ingredient For Personal Care Products", *HAPPI* May, 2000, pp. 65–68.

Elizebeth Pennisi, entitled "Chitin Craze", Science News vol. 144, Jul. 31, 1993, pp. 72–74.

* cited by examiner

*Primary Examiner*—Richard D. Lovering
(74) *Attorney, Agent, or Firm*—William J. Uhl

(57) ABSTRACT

A composition and method for treating oversprayed paints in paint spray booths is provided. The composition includes an aqueous solution of a compound such as chitosan, and a complex metal salt, such as aluminum chlorohydrate, capable of flocculating the oversprayed paint, and optionally, bentonite clay. The composition is useful for detackifying and flocculating oversprayed paint, and is particularly useful as a liquid concentrate for the addition to wash systems in paint spray booths for water-based and solvent-based paints. The composition is also useful in decreasing the time for phase separation of the organic phase and the aqueous phase in solvent-based removal processes.

6 Claims, No Drawings

COMPOSITIONS INCORPORATING CHITOSAN FOR PAINT DETACKIFICATION

FIELD OF THE INVENTION

The present invention relates to compositions useful in paint overspray removal processes. More particularly, the present invention relates to compositions for detackifying and flocculating paint, which compositions are useful in water-based and solvent-based paint denaturant systems.

BACKGROUND OF THE INVENTION

Automatic spraying techniques have long been employed for painting large articles such as cars, trucks, refrigerators, etc. The items being sprayed are generally advanced along a conveyor line which passes through a water wash paint spray booth where a fine spray of paint is directed at the articles being painted from spray guns which are located at the sides of the conveyor. Overspray paint, that is, paint which does not contact the article being painted, forms a fine mist of paint in the air space surrounding the painted article. This paint mist must be removed from the air. To accomplish this, the contaminated air is pulled through the paint spray booth by air exhaust fans. A curtain of circulating water is maintained across the path of the air in a manner such that the air must pass through the water curtain to reach the exhaust fans. As the air passes through the water curtain, the paint mist is "scrubbed" from the air and carried to a sump basin usually located below the paint spray booth. In this area, the paint particles are separated from the water so that the water may be recycled and the paint particles disposed of.

The term "paint" as used herein is intended to encompass a mixture of resin, pigment, and a suitable liquid vehicle that is reasonably fluid and provides a thin and adherent coating when applied to a substrate. As such, the term "paint" is intended to encompass paints, lacquers, varnishes, base coats, clear coats, primers and the like.

Paint is a tacky material and it tends to coagulate and adhere to the spray booth surfaces, particularly in the sump and drain areas, and must constantly be removed from the sump to prevent clogging of the sump drain and recirculating system. In order assist in the removal of the oversprayed paint from the air and to provide efficient operation of paint spray booths, detackifying agents are commonly employed in the water used in such systems, and are typically incorporated into the water wash recirculated in the paint spray system. Detackifying the paint eliminates or minimizes the adhesive properties, or tackiness, of the paint, thereby preventing the oversprayed paint from adhering to the walls of the spray booth.

One of the difficulties with recovering paint overspray in a water wash spray booth as described above is the limited amount of paint which can be incorporated into the water. As such, detackifying agents should have a high load capacity, such that the water wash recirculated through the spray booth can detackify, coagulate and flocculate a high volume of oversprayed paint before exhaustion.

Moreover, in recent years, the need to reduce solvent emission has resulted in the reduction of solvent-based or solventborne paints, and an increase in the use of water-based or waterborne paints. The organic content in solvent-based paints, however, requires the use of different detackifying processes in paint spray booths.

For example, U.S. Pat. No. 5,259,976 discloses the use of cationic polymers such as acrylamide polymers for detackifying paint and improving paint spray booth efficiency, and using sodium aluminate to adjust the pH of the system. U.S. Pat. No. 5,019,138 discloses the use of an organic solvent, i.e., N-methyl pyrrolidone, to scrub the paint overspray from the surrounding air. However, the use of high quantities of organic solvent needed for this process is expensive and a potential health and environmental hazard. In addition, such detackifying agents are not effective for detackifying both water-based and solvent-based paints.

U.S. Pat. No. 5,223,141 discloses a method for removing and recovering solvent-based paint overspray through contact with an agitated dispersion of an organic solvent in water, and then allowing the dispersion to phase separate, for separation of the organic phase from the aqueous phase. Such dispersion, however, is often difficult to separate for removal of the paint from the water.

U.S. Pat. No. 4,888,386 discloses a composition for use in detackifying both waterborne and solvent enamels, which includes a melamine-formaldehyde polymer, a polyvinyl alcohol and a styrene acrylate copolymer. Such materials, however, are not readily biodegradable, and therefore pose environmental concerns for disposal.

Accordingly, a need exists for a composition which is useful for detackifying both water-based and solvent-based paints, which is capable of effectively decreasing emulsion formation in solvent-based paint denaturant systems, and which is biodegradable.

SUMMARY OF THE INVENTION

The present invention includes a composition for treating oversprayed paints. The composition includes: (a) an aqueous solution of a compound having the following structure:

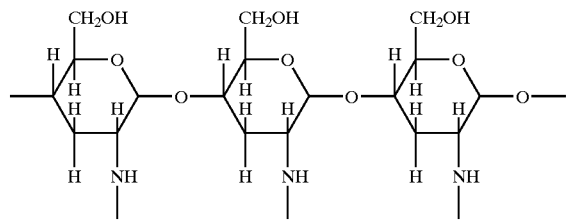

such as an aqueous solution of chitosan; (b) a complex metal salt, such as aluminum chlorohydrate, which is capable of flocculating the oversprayed paint; and (c) water. The aqueous solution of chitosan preferably includes a mixture of water, chitosan, and an acid, such as acetic acid, capable of rendering the chitosan soluble in water. The composition is particularly useful as a liquid concentrate, which can be added to circulating water systems in paint spray booths, for use with both water-based and solvent-based paints. Bentonite clay may optionally be included in the composition, particularly when the composition is used in connection with solvent-based paints.

In a further embodiment, the present invention involves a method of treating oversprayed paint particles in a paint spray booth including a circulating water system. In such a method, oversprayed paint is contacted with a water system including a composition comprising a) an aqueous solution of a compound having the following structure:

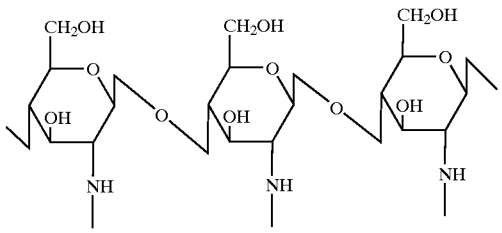

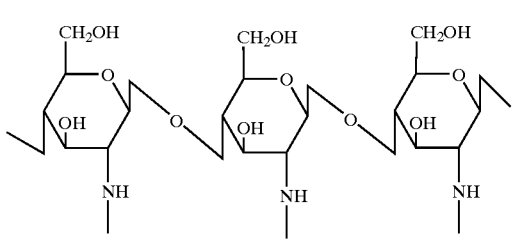

(b) a complex metal salt capable of flocculating the oversprayed paint; and (c) water. The aqueous solution of the compound is preferably an aqueous solution of chitosan in water. The composition detackifies and flocculates the oversprayed paint particles. Such a method may further include a step of separating the flocculated oversprayed paint particles from the water system.

In yet a further embodiment, the present invention includes a method of treating oversprayed paint in a paint spray booth including a solvent-based paint denaturant system. Such a method includes contacting the oversprayed paint with a dispersion of an organic solvent component in water, which dispersion further includes an aqueous solution of a compound as set forth above and a complex metal salt. Such contacting collects the oversprayed paint in the dispersion. The dispersion is then phase separated into an organic phase containing paint overspray, and an aqueous phase, which phases are then separated. The inclusion of the aqueous solution of chitosan and the complex metal salt within the dispersion decreases the time for phase separation of the organic phase and the aqueous phase. This causes the waterborne paint solids to migrate into the organic phase.

DETAILED DESCRIPTION OF THE INVENTION

Other than in the operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As noted, the composition of the present invention includes an aqueous solution of a compound having the following structure:

as well as a complex metal salt capable of flocculating the oversprayed paint and water. The aqueous solution of the compound identified by structure I above is preferably an aqueous solution of chitosan, and more preferably includes a mixture of water, chitosan, and an acid capable of rendering the chitosan soluble in water.

Chitosan is a deacylated derivative of chitin, $(C_8H_{13}NO_5)_n$, which is a glucosamine polysaccharide structurally similar to cellulose, which is the principle constituent of the shells of crustaceans and insects such as crabs, lobsters and beetles. Chitin is not like most poysaccharides, in that special properties are derived through amine side groups and hydroxyl functionality appearing in its structure. Treating chitin with a strong base such as caustic soda hydrolyzes the acetamido groups to produce free amine groups. This results in the production of chitosan, having the following chemical structure:

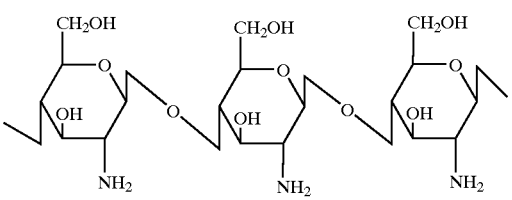

Chitosan is a polymer having a strong positive charge, which most polysaccharides lack. Such charge readily permits interaction with negatively charged surfaces. In addition, chitosan includes both hydroxyl functionality and amine functionality, lending itself to reactive chemistry on either side group.

The aqueous solution of chitosan is provided as a mixture of chitosan and water. The chitosan is preferably provided in the aqueous solution as a stock solution for later use in preparation of the composition of the present invention. The stock solution of chitosan in water preferably includes chitosan in water in an amount of from about 0.5 to about 5 percent by weight chitosan based on the weight of the stock solution, more preferably about 0.5 to about 3 percent by weight, with amounts of about 1 percent by weight being particularly preferred.

Chitosan is not readily dissolvable in water. Accordingly, various agents can be added to render the chitosan more readily soluble. For example, an acid may be added to the water prior to addition of the chitosan, to provide an acidic aqueous solution for dissolving the chitosan. Examples of useful acids include, acetic acid, sulfuric acid, hydrochloric acid, citric acid, sulfamic acid and mixtures thereof, with acetic acid being particularly preferred. The acid is preferably provided in the stock solution in an amount of from about 0.5 to about 5 percent by weight, based on the weight of the stock solution, more preferably about 0.5 to about 3 percent by weight.

The aqueous solution of chitosan includes a viscosity of from about 200 to about 3000, preferably about 1000 to about 1750 centipoise (cps).

The composition of the present invention further includes a complex metal salt, which is capable of flocculating the oversprayed paint. The complex metal salt may be any complex metal salt which is capable of coagulating and flocculating paint. Examples of useful complex metal salts including those selected from the group consisting of aluminum chlorohydrate, aluminum sulfate (alum), zinc chloride, ferric chloride, calcium chloride, magnesium hydroxide, and mixtures thereof. Aluminum chlorohydrate is particular preferred for use in the composition of the present invention.

The composition of the present invention preferably includes the complex metal salt dissolved in water in an amount which is greater than the amount of the aqueous solution of chitosan, based on the total weight of the composition. Preferably, the complex metal salt is provided in the water solution in an amount of from about 2 to about 40 percent by weight, based on the total weight of the composition. The chitosan is preferably provided in the water solution in an amount of from about 0.1 to about 10 percent by weight, based on the total weight of the composition. The acid is preferably provided in an amount of from about 0.1 to about 10 percent by weight, based on the total weight of the composition. In particularly preferred embodiments, the acid and the chitosan are provided in equal amounts, based on the total weight of the composition.

The composition of the present invention may further include bentonite clay. The incorporation of bentonite clay into the composition is particularly useful when the composition is intended for use in connection with solvent-based paint denaturant systems. When used, the bentonite clay is preferably provided in an amount of from about 5 to 10 percent, based on the total weight of the composition.

Additionally, other compounds may be included in the composition of the present invention to act as co-flocculants. Particularly useful compounds include acrylamide polymers, and in particular cationic acrylamide polymers. Examples of useful cation acrylamide polymers include dimethylaminoethylmethacrylate sulfuric acid salt, dimethylaminoethylmethacrylate methyl chloride quarternary ammonium salt, dimethylaminoethylmethacrylate methyl sulfate quarternary ammonium salt dimethylaminoethylacrylate methyl chloride quarternary ammonium salt, acrylamidopropyltrimethyl ammonium chloride, and mixtures thereof.

The compositions of the present invention are typically prepared by first forming an aqueous solution of the chitosan. This is accomplished by combining acid and water to form an acidic aqueous solution, and then adding chitosan into the acidic aqueous solution, with mixing at room temperature for a period of, for example, 8 to 15 hours.

After formation of the aqueous solution of chitosan, a portion of this aqueous solution is added to water. The complex metal salt is then added to the solution, with gentle stirring, to form the composition of the present invention. Bentonite clay is then optionally added to the composition.

The composition of the present invention is preferably prepared in the form of a liquid concentrate, which is intended for addition to water systems for use in paint spray booths. As such, the composition may typically be added to a volume of water which is recirculated through a paint spray booth as an initial detackifying additive, and also as a maintenance detackifying additive during operation of the paint spray booth, as will be discussed in more detail herein.

When used in such water systems, the composition is typically provided in an amount of from about 0.01 to about 10 percent of the volume of water recirculated through the system, such as in an amount of from about 0.01 to about 0.15 percent by weight (about 100 to about 1500 parts per million (ppm)).

The water system including the composition therein is preferably maintained at a pH between about 7–10, more preferably between about 7.5 and 9.0. Since the composition of the present invention may be slightly acidic, the use of the composition in a recirculating water system may affect the pH of the system. Accordingly, the pH of the water system may be adjusted as is known in the art. For example, small increments of liquid caustic soda, 50% NaOH, may be added to the water system to maintain the pH in the desired range. Such liquid caustic soda is preferably added to the water system in a proportion of 0.5 to 1.5 ml liquid caustic soda per 10 ml of composition.

In accordance with the method of the present invention, oversprayed paint particles in a paint spray booth are treated with a circulating water system including a composition containing an aqueous solution of chitosan and a complex metal salt as described above. In particular, a paint spray booth including a circulating aqueous system is provided, as is known in the art. The composition of the present invention as discussed above is added to the water system of the paint spray booth. The circulating water system forms a continuous moving curtain which scrubs an air flow containing paint overspray so as to collect the paint overspray in the water curtain. Paint spray booths containing continuous curtains of water to scrub air flows containing paint overspray are known in the art, for example U.S. Pat. No. 4,980,030, which discloses typical paint spray booths.

In operation, an object to be painted is placed within the paint spray booth, and is painted using known spray techniques. The overspray paint is contacted with the continuous curtains of water which are pumped through the paint spray booth in known manner. Such contacting of the overspray paint with the water solution including the composition of the present invention causes the paint to flocculate and separate from the wash water, thereby forming a sludge layer on the water solution which is circulated through the paint spray booth. In addition, the composition of the present invention also detackifies the flocculated paint. The amount of the flocculated paint sludge in the water solution is monitored and removed periodically, through known methods. Additionally, the pH of the water solution is periodically monitored and readjusted, if necessary.

The effectiveness of the detackifying agent is also periodically monitored during operation of the paint spray booth. This may be accomplished by monitoring the tackiness of the paint sludge removed from the paint spray booth. Alternatively, the level of the detackifying agent may be monitored to maintain a desired predetermined threshold level of the composition within the wash water. When the wash water fails to effectively detackify the oversprayed paint and/or when the level of the detackifying agent drops below a desired predetermined threshold level, a maintenance dosage of the composition of the present invention may be added to the recirculating water, thereby maintaining the effectiveness of the paint spray booth.

The composition of the present invention is used in a similar manner when used in connection with solvent-based paint denaturant systems. An example of such a system is described in detail in U.S. Pat. No. 5,223,141, the disclosure of which is incorporated herein by reference thereto. Such solvent-based paint denaturant systems typically include as a wash water a dispersion of an organic solvent component in water. The composition of the present invention including an aqueous solution of chitosan and a complex metal salt is added to the dispersion.

More particularly, the organic solvent may comprise a single organic solvent or a mixture of organic solvents. Examples of organic solvents useful include alkyl esters of polycarboxylic acids or mixtures of such esters, such as dimethyl adipate, dimethyl glutarate, dimethyl succinate and mixtures thereof; diisobutyl adipate, diisobutyl glutarate, diisobutyl succinate and mixtures thereof.

Examples of other organic solvents include polyol ethers including mono and diethers of glycols such as mono or dialkyl or mono or diaryl or mixed alkyl and aryl ethers of glycols such as ethylene glycol, diethylene glycol, dipropylene glycol and propanol and mixtures of glycol ethers. Examples of specific polyol ethers include ethylene glycol monobutyl ether, ethylene glycol monophenyl ether, diethylene glycol monobutyl ether, propylene glycol monomethyl ether, propylene glycol monophenyl ether, dipropylene glycol monomethyl ether, dimethylether of ethylene glycol and dimethylether of diethylene glycol. Other examples of organic solvents include furfural and isophorone.

The concentration of the organic solvent component in the aqueous dispersion is typically from 2 to 50, preferably from 15 to 25 percent by weight based on weight of organic solvent component and water. Concentrations less than 2 percent by weight are undesirable because the mechanism of pumping would not allow proper dispersion of the organic solvent component, whereas concentrations greater than 50 percent by weight are undesirable because of cost and unnecessarily high volumes for further processing.

The organic solvent component can be dispersed into the water by simply adding it to the circulating water in a typical water wash spray booth. The detackifying agent of the present invention is also added into the water in a similar manner. The pumping and circulation action associated with the spray booth insures that the organic solvent component will be stably dispersed in the aqueous medium, and ensures that the detackifying agent will remain properly mixed in the aqueous medium.

The paint overspray typically contains pigments, organic resins and organic solvent associated with industrial paints. Typical paints are acrylic-based paints, urethane-based paints, base coat/clear coat paints and high solids paints which are used in the automotive, appliance and general industrial markets.

As described above, the overspray paint is contacted with the continuous curtains of water which are pumped through the paint spray booth in known manner. Such contacting of the overspray paint with the dispersion including the organic solvent in water and the composition of the present invention collects the overspray paint in the dispersion.

The dispersion which contains the paint overspray is pumped through the system in known manner, such as to a sludge tank where the paint overspray can optionally be removed from the dispersion. The continuous circulation and pumping action keeps the dispersion agitated and stable.

In order to remove the paint sludge, the dispersion is transferred to a holding tank, where the dispersion spontaneously phase separates into an organic phase and an aqueous phase. The organic phase which contains most if not all of the paint overspray is separated from the aqueous phase by skimming. The inclusion of the aqueous solution of chitosan and the complex metal salt imparts a capacity to reduce emulsification of the solvent layer, and decreases the time for phase separation.

The organic phase may be further separated into an organic solvent portion and a portion which contains paint solids which comprise pigment and organic resin. Typical separating units would be a distillation column, a thin film evaporator or a centrifuge. The organic solvent portion (which contains the organic solvent component initially used to formulate the dispersion as well as at least a portion of the organic solvent component associated with the paint) is recovered in either the distillate or centrifugate, and may be returned to the recirculating system, where it can be readily dispersed. The paint solids as separated are reclaimed for further use or are disposed of. Since the paint is uncured, it can be used as a curable filler in adhesives or in paints.

Illustrating the invention are the following examples which, however, are not to be considered as limiting the invention to their details. All parts and percentages in the examples as well as throughout the specification are by weight unless otherwise indicated.

EXAMPLES

Example 1

This example demonstrates paint detackification with a composition which includes a complex metal salt without the incorporation of chitosan.

A composition was prepared including 25 grams of 50% aluminum chlorohydrate solution and 75 grams of deionized water. The aluminum chlorohydrate was added to the water and mixed, to produce Composition 1.

Composition 1 as prepared was incorporated into the recirculation system of a paint spray booth similar to those described in U.S. Pat. No. 5,116,514. In particular, the recirculation system was charged with an amount of Composition 1 to provide the recirculation system with a level of 100 parts per million (100 ppm) of Composition 2. 0.2 ml of 50% sodium hydroxide was added to adjust the pH of the recirculation system. The pH was determined to be 8.3, at a temperature of 70° F.

The recirculation system in the paint spray booth was then turned on. The paint spray booth was used for spraying of a clearcoat paint available from PPG Industries, Inc. as DCT5002H Diamond-coat clear, an acrylic clearcoat paint. 100 ml of the paint was prepared to be used in the paint spray system. Spraying was conducted at a spray rate of 2 ml per minute.

During spraying, the recirculation system including Composition 1 had a moderate detackifying effect on the paint. The paint slightly re-livens when rolled between the fingers. After spraying of 34 ml of paint, the recirculation system including Composition 1 reached the failure point, as evidenced through clogging of the recirculation system.

Example 2

Example 2 demonstrates paint detackification with a composition which includes chitosan, but does not include a complex metal salt.

An aqueous chitosan solution was provided including 1% chitosan and 1% acetic acid in water. A composition was prepared including 25 grams of this aqueous chitosan solution and 75 grams of deionized water. The aqueous chitosan solution was added to the water and mixed, to produce Composition 2.

Composition 2 as prepared was incorporated into the recirculation system of a paint spray booth in a similar manner as in Example 1. In particular, the recirculation system was charged with an amount of Composition 2 to provide the recirculation system with a level of 100 parts per million (100 ppm) of Composition 2. Sodium hydroxide was added in an amount of 0.2 ml to adjust the pH of the recirculation system to a value of 8.5, at a temperature of 72° F.

The recirculation system in the paint spray booth was then turned on, and 100 ml of the clearcoat paint from Example 1 was prepared for use in the spraying system. Spraying of the clearcoat paint was conducted at a spray rate of 2 ml per minute.

During spraying, the recirculation system including Composition 2 had a moderate detackifying effect on the paint. The paint slightly re-livens when rolled between the fingers. After spraying of 20 ml of paint, the recirculation system including Composition 2 reached the failure point dramatically, as evidenced through sever clogging of the recirculation system.

Example 3

This example demonstrates paint detackification with a composition prepared according to the present invention.

An aqueous chitosan solution was provided as in Example 2, including 1% chitosan and 1% acetic acid in water. A composition was prepared including 25 grams of this aqueous chitosan solution, 25 grams of 50% aluminum chlorohydrate solution and 50 grams of deionized water. The aqueous chitosan solution and the aluminum chlorohydrate were added directly to the water and mixed, to produce Composition 3.

Composition 3 as prepared was incorporated into the water recirculation system in a paint spray booth in a similar manner as in Example 1 and 2. In particular, the recirculation system was charged with an amount of Composition 3 to provide the recirculation system with a level of 100 parts per million (100 ppm) of Composition 3. 0.2 ml of 50% sodium hydroxide was added to the recirculation system. The pH of the recirculation system was determined to be 8.0, at a temperature of 72° F. To increase the pH, 0.1 ml of additional 50% sodium hydroxide was added, achieving a pH of 8.5.

The recirculation system in the paint spray booth was turned on, and 100 ml of the clearcoat paint from Example 1 was prepared for use in the spraying system. Spraying of the clearcoat paint was conducted at a spray rate of 2 ml per minute.

During spraying, the recirculation system including Composition 3 effctively detackified the paint, with only some sticking of the paint to the sides of the spray booth. The paint easily re-livens when rolled between the fingers. After spraying of 54 ml of paint, the recirculation system including Composition 2 reached the failure point, as evidenced through clogging of the recirculation system.

The results of Example 3 demonstrate the effectiveness of the paint detackifying composition of the present invention. In particular, over half of the paint contained within the paint spraying system, 54 ml, was able to be sprayed before the recirculation system failed. Further, a comparison of the results of Examples 1–3 demonstrates synergistic results through the combination of the aqueous chitosan solution and the complex metal salt. In particular, Composition 3, which included both the aqueous chitosan solution and the complex metal salt performed much better as a paint detackifier than either of Compositions 1 or 2, which included only the complex metal salt or the aqueous chitosan solution, respectively.

Example 4

Example 4 demonstrates paint detackification of a solvent-borne paint using a conventional solvent-based paint detackifying composition in combination with a standard clay additive.

In particular, Composition 4 was prepared with the following components:

TABLE 1

| COMPONENT | AMOUNT |
| --- | --- |
| Organic Solvent[1] | 10 ml |
| Additive[2] | 0.1 ml |
| Water | 90 ml |

[1]BCTL 3001, an organic solvent-based detackifier which includes dibasic acid diisobutyl ester, commercially available from PPG Industries, Inc.
[2]BCTL 3001 Plus Additive, a clay additive which includes an acrylic polymer, commercially available from PPG Industries, Inc.

The organic solvent-based detackifier, additive and water were combined in a 250 ml glass jar, and mixed well to produce Composition 4.

In order to test the detackifying properties of Composition 4, 5 ml of a high solids solvent-borne paint commercially available from PPG Industries, Inc. as KTP Solvent-Borne Paint was added to the jar. The jar was mixed vigorously for 30 seconds, and allowed to phase separate for 5 minutes. The contents of the jar were then visually observed for phase separation and clarity.

After 5 minutes, visual observation detected rapid phase separation into an organic layer and an aqueous layer. Paint solids were present in the organic layer. The aqueous layer had minimal water clarity.

Example 5

Example 5 demonstrates paint detackification of a solvent-borne paint using a conventional solvent-based paint detackifying composition in combination with clay.

A clay additive was prepared by mixing 44 grams of bentonite clay with 456 grams of water. The clay additive was incorporated into Composition 5 prepared with the following components:

TABLE 2

| COMPONENT | AMOUNT |
| --- | --- |
| Organic Solvent[1] | 10 ml |
| Clay additive | 0.1 ml |
| Water | 90 ml |

[1]BCTL 3001, an organic solvent-based detackifier which includes dibasic acid diisobutyl ester, commercially available from PPG Industries, Inc.

The organic solvent-based detackifier, clay additive and water were combined in a 250 ml glass jar, and mixed well, to produce Composition 5.

The detackifying properties of Composition 5 were tested in a similar manner as in Example 4, by mixing with the high solids solvent-borne paint and settling.

After 5 minutes, visual observation detected rapid phase separation into an organic layer and an aqueous layer. The aqueous layer had moderate to good water clarity. However, while some paint solids were present in the organic layer, some solids were settled on the bottom of the jar.

Example 6

Example 6 represents a paint detackifying composition in accordance with the present invention including a solvent-based paint detackifier including an aqueous chitosan solution.

A clay/chitosan additive was prepared by combining 88 grams of bentonite clay and 911.5 grams of water with 0.5 grams of Composition 3 prepared in accordance with Example 3. This clay/chitosan additive was then combined a solvent-based component, to form Composition 6 with the following components:

TABLE 1

| COMPONENT | AMOUNT |
|---|---|
| Organic Solvent[1] | 10 ml |
| Clay/Chitosan Additive | 0.1 ml |
| Water | 90 ml |

[1]BCTL 3001, an organic solvent-based detackifier which includes dibasic acid diisobutyl ester, commercially available from PPG Industries, Inc.

The organic solvent-based detackifier, clay/chitosan additive and water were combined in a 250 ml glass jar, and mixed well, to produce Composition 6.

The detackifying properties of Composition 6 were tested in a similar manner as in Examples 4 and 5, by mixing with the high solids solvent-borne paint and settling.

After 5 minutes, visual observation detected rapid phase separation into an organic layer and an aqueous layer. The aqueous layer had moderate to good water clarity. Moreover, the paint solids were present in the organic layer.

A comparison of Examples 4–6 demonstrates the advantages seen through the use of the present invention as compared with conventional paint-detackifiers for solvent-borne paints. For example, Composition 6 prepared in accordance with the present invention including an additive with clay and an aqueous chitosan solution provided for rapid phase separation with the paint solids effectively present within the organic phase, and with clarity in the water phase. Composition 4, on the other hand, provided for only minimal water clarity, while Composition 5 resulted in settling of the paint solids, demonstrating poor migration into the water phase.

While the invention has been described in terms of preferred embodiments, it is to be understood that various modifications thereof will become apparent to those skilled in the art upon reading the specification. Therefore, it is to be understood that the invention disclosed herein is intended to encompass such modifications as fall within the scope of the appended claims.

What is claimed is:

1. A liquid concentrate composition for addition to a circulating water system for treating oversprayed waterborne and solventborne paints, said liquid concentrate composition comprising:

(a) 2 to 40% by weight of a complex metal salt capable of flocculating the oversprayed paint;

(b) 0.1 to 10% by weight of a compound having the following structure:

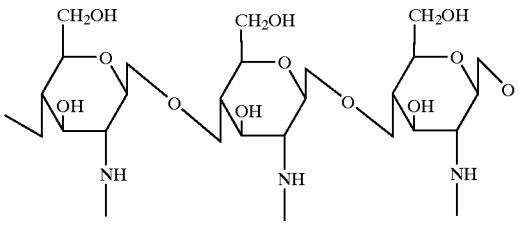

present in an aqueous solution having a viscosity of from about 200 to 3000 centipoise;

(c) acid capable of rendering the compound soluble in water;

(d) water; and (e) 5 to 10% by weight of bentonite clay.

2. A composition as in claim 1, wherein said complex metal salt is selected from the group consisting of aluminum chlorohydrate, aluminum sulfate, zinc chloride, ferric chloride, calcium chloride, magnesium hydroxide, and mixtures thereof.

3. A composition as in claim 1, wherein said complex metal salt is provided in a greater amount than component (b) based on the total weight of the composition.

4. A composition as in claim 1, wherein said compound (b) is chitosan.

5. A composition as in claim 1, wherein said acid is provided in an amount of from about 0.1 to about 10 percent by weight, based on the total weight of the composition.

6. A composition as in claim 1, wherein said acid is acetic acid.

* * * * *